(12) United States Patent
Paulson et al.

(10) Patent No.: US 11,612,847 B2
(45) Date of Patent: Mar. 28, 2023

(54) SYSTEMS AND METHODS FOR REMOVING PARTICULATES OF A FISSILE MATERIAL

(71) Applicant: Global Nuclear Fuel-Americas, LLC, Wilmington, NC (US)

(72) Inventors: Lon E. Paulson, Wilmington, NC (US); Frank E. Beaty, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 171 days.

(21) Appl. No.: 15/884,719

(22) Filed: Jan. 31, 2018

(65) Prior Publication Data

US 2019/0232208 A1    Aug. 1, 2019

(51) Int. Cl.
*B01D 35/12*      (2006.01)
*B01D 46/71*      (2022.01)
(Continued)

(52) U.S. Cl.
CPC ......... *B01D 46/71* (2022.01); *B01D 29/0065* (2013.01); *B01D 29/52* (2013.01); *B01D 29/66* (2013.01); *B01D 35/12* (2013.01); *B01D 46/24* (2013.01); *B01D 46/2403* (2013.01); *B01D 46/58* (2022.01); *B01D 46/90* (2022.01); *G21F 9/02* (2013.01); *B01D 2267/60* (2013.01);
(Continued)

(58) Field of Classification Search
CPC ................. B01D 46/00; B01D 46/0068; B01D 46/002; B01D 46/0058; B01D 46/24; B01D 46/2403; B01D 2267/60; B01D 2279/35; B01D 35/12; B01D 29/66; B01D 29/52; B01D 29/0065; G21F 9/02; G21F 9/007; G21C 21/00; G21Y 2002/40
USPC ............ 55/282–305, 341.1–341.7, 361–382; 95/279
See application file for complete search history.

(56) References Cited

U.S. PATENT DOCUMENTS 4,194,910 A * 3/1980 Mal ..................... C22C 32/0052
                                                                75/239
4,465,498 A * 8/1984 Stephenson ............ B01D 46/90
                                                                55/304
(Continued)

FOREIGN PATENT DOCUMENTS

EP          0290028 A1 *  5/1988
EP          1137597        7/2000
(Continued)

*Primary Examiner* — Robert A Hopkins
(74) *Attorney, Agent, or Firm* — Harness, Dickey & Pierce, P.L.C.

(57) ABSTRACT

A system for removing particulates of a fissile material includes first and second filtration paths. A first filter and a first valve are disposed in the first filtration path. A second filter and a second valve are disposed in the second filtration path. The first valve and the second valve are configured to switch between a dual open state and a mixed open/closed state. During the dual open state, the first valve and the second valve axe open to permit concurrent flows of the effluent gas through the first and second filtration paths. During the mixed open/closed state, one of the first valve and the second valve is open while the other of the first valve and the second valve is closed to permit the particulates on a corresponding one of the first filter and the second filter to be dislodged by a countercurrent flow of a purging gas.

23 Claims, 5 Drawing Sheets

(51) Int. Cl.
*B01D 46/24* (2006.01)
*G21F 9/02* (2006.01)
*B01D 46/58* (2022.01)
*B01D 46/90* (2022.01)
*B01D 29/66* (2006.01)
*B01D 29/52* (2006.01)
*B01D 29/00* (2006.01)
*G21F 9/00* (2006.01)
*G21C 21/00* (2006.01)

(52) U.S. Cl.
CPC .......... *B01D 2279/35* (2013.01); *G21C 21/00* (2013.01); *G21F 9/007* (2013.01)

(56) References Cited

U.S. PATENT DOCUMENTS

| | | | | |
|---|---|---|---|---|
| 4,668,253 A | * | 5/1987 | Lonardi | B01D 45/02 266/157 |
| 4,968,424 A | * | 11/1990 | Plaisier | B01D 29/15 210/346 |
| 5,178,652 A | * | 1/1993 | Huttlin | B01D 46/0021 55/302 |
| 5,215,557 A | * | 6/1993 | Johnson | B01D 47/06 96/57 |
| 5,795,359 A | * | 8/1998 | McLeish | B01D 46/0067 55/302 |
| 5,834,628 A | | 11/1998 | Hunter et al. | |
| 5,882,552 A | | 3/1999 | Song et al. | |
| 5,925,156 A | * | 7/1999 | Motoki | F01N 3/2803 55/525 |
| 5,930,994 A | * | 8/1999 | Shimato | F01N 3/023 60/274 |
| 6,451,091 B1 | * | 9/2002 | Avina | B01D 46/44 96/138 |
| 6,656,391 B1 | | 12/2003 | Bonnerot et al. | |
| 7,029,634 B2 | | 4/2006 | Sherwood, Jr. | |
| 7,833,329 B2 | * | 11/2010 | Mahon, III | B01D 46/0068 96/421 |
| 9,217,189 B2 | | 12/2015 | Davidson et al. | |
| 2005/0011172 A1 | * | 1/2005 | Lindblom | B01D 46/62 55/482 |
| 2005/0039600 A1 | * | 2/2005 | Lim | B01D 46/58 55/471 |
| 2008/0257148 A1 | * | 10/2008 | Klemm | B03C 3/017 95/267 |
| 2009/0020012 A1 | * | 1/2009 | Holten | B01D 46/71 95/280 |
| 2010/0307339 A1 | * | 12/2010 | Tadrous | B01D 46/2418 95/280 |
| 2013/0199140 A1 | * | 8/2013 | Mock | B01D 46/0005 55/484 |
| 2014/0102105 A1 | * | 4/2014 | Janapaneedi | F02C 3/34 60/39.5 |
| 2014/0346115 A1 | * | 11/2014 | Namiki | B01J 20/0229 210/682 |

FOREIGN PATENT DOCUMENTS

| | | | |
|---|---|---|---|
| EP | 1041578 | A2 | 10/2000 |
| EP | 2160358 | A1 | 3/2010 |
| EP | 3094595 | A1 | 11/2016 |
| JP | H0725920 | U * | 5/1995 |
| JP | 2004160367 | A * | 6/2004 |

* cited by examiner

SYSTEMS AND METHODS FOR REMOVING PARTICULATES OF A FISSILE MATERIAL

BACKGROUND

Field

The present disclosure relates to systems and methods for removing particulates from a gas stream.

Description of Related Art

During nuclear fuel fabrication, particulates of fissile material (e.g., oxides of uranium) frequently result in an undesired level of buildup in downstream heating, ventilation, and air conditioning (HVAC) systems. As a result, increased maintenance and contamination control measures are needed to replace and/or clean downstream HVAC system components (e.g., intervening ductwork, primary HEPA filters, secondary HEPA filters), which also increases downtime and costs.

SUMMARY

A system for removing particulates of a fissile material may include a conduit structure including a lower section, an intermediate section, and an upper section. The lower section may define an inlet flow path and a chute portion. The inlet flow path is configured to receive an effluent gas (e.g., process equipment effluent gas) containing the particulates. The chute portion may be configured to collect the particulates from the effluent gas. The intermediate section defines a first filtration path and a second filtration path (e.g., in parallel). The upper section may define an outlet flow path (e.g., gas outlet flow path). A first filter and a first valve are disposed in the first filtration path of the conduit structure. A second filter and a second valve are disposed in the second filtration path of the conduit structure. The first valve and the second valve are configured to switch between a dual open state and a mixed open/closed state when filtering the particulates from the effluent gas. During the dual open state, the first valve and the second valve are open to permit concurrent flows of the effluent gas through the first filtration path and the second filtration path. A blowback assembly is configured to supply a countercurrent flow of a purging gas to a closed one of the first filtration path and the second filtration path during the mixed open/closed state. During the mixed open/closed state, one of the first valve and the second valve is open while the other of the first valve and the second valve is closed to permit the particulates on a corresponding one of the first filter and the second filter to be dislodged by the countercurrent flow of the purging gas.

A method of removing particulates of a fissile material includes filtering an effluent gas containing the particulates by flowing the effluent gas through a first filter and/or a second filter. Additionally, the method includes alternately performing a blowback (e.g., countercurrent blowback) on the first filter and the second filter such that the blowback and the filtering do not occur simultaneously on a same one of the first filter and the second filter. Furthermore, the method includes collecting the particulates displaced during the blowback. Such a method permits the removal and direct recycling of dry fissile material particulates, thereby eliminating the need for separate wet recovery and/or purification processes.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
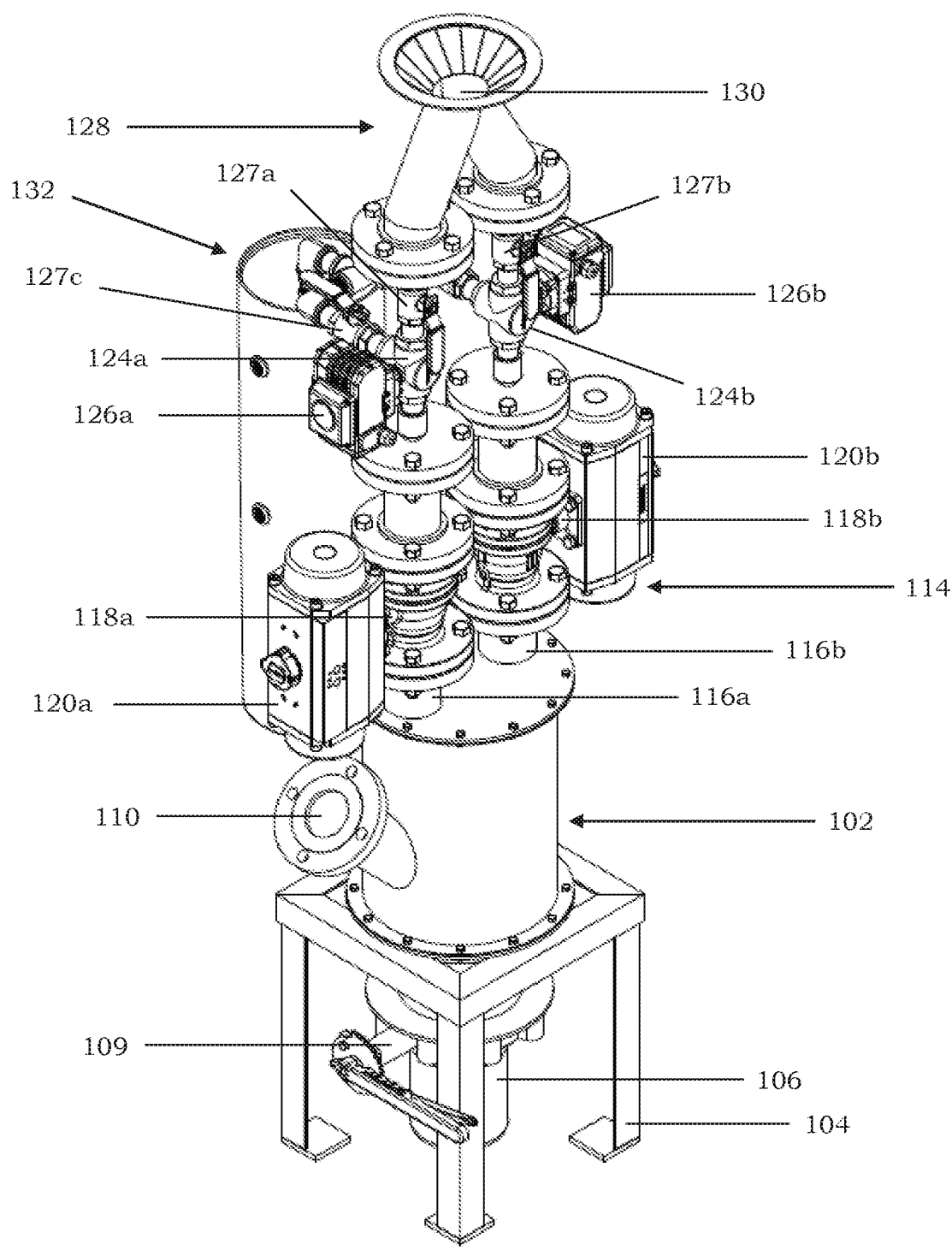
FIG. 1 is a perspective view of a system for removing particulates of a fissile material according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
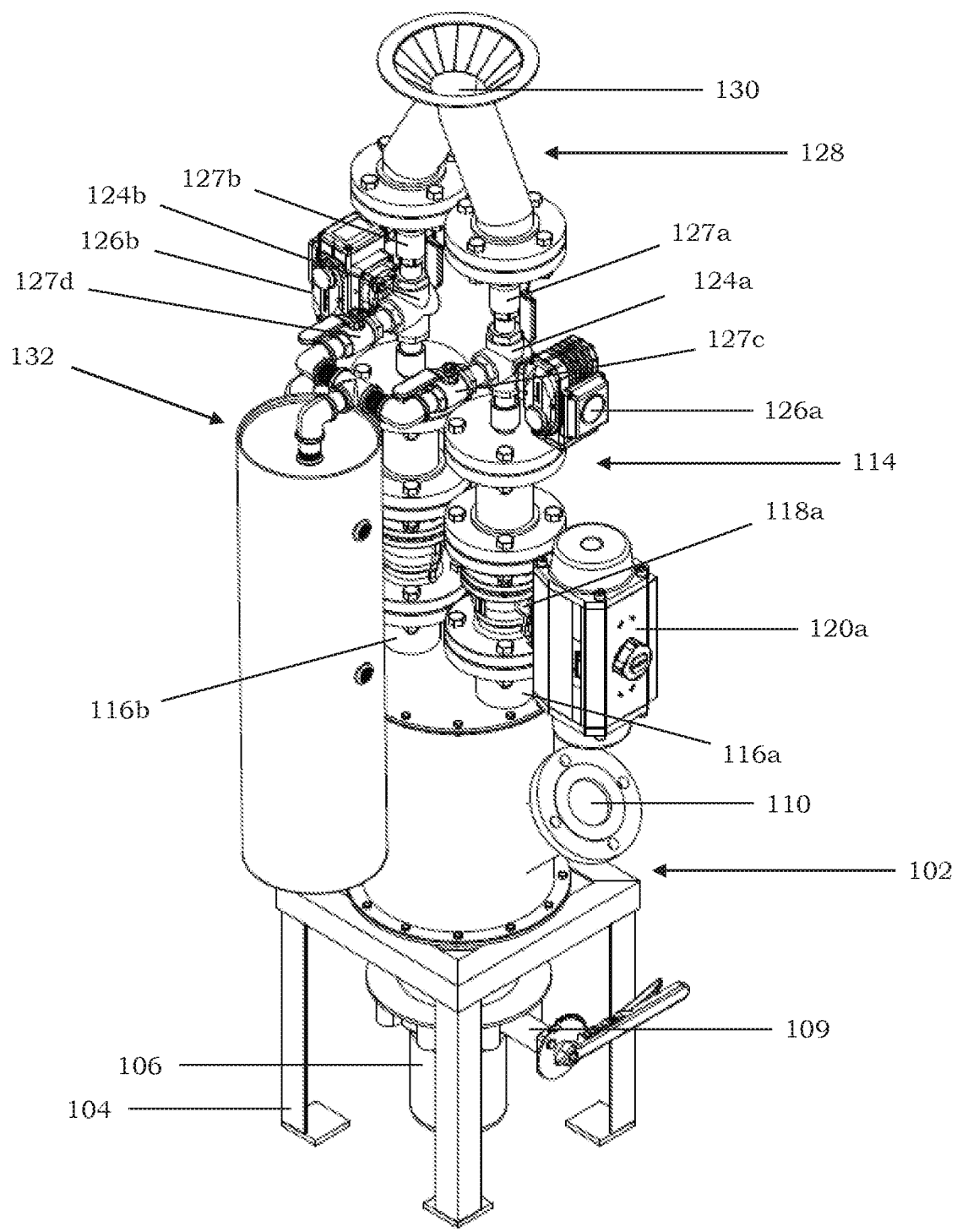
FIG. 2 is another perspective view of the system of FIG. 11.
Figure 3:
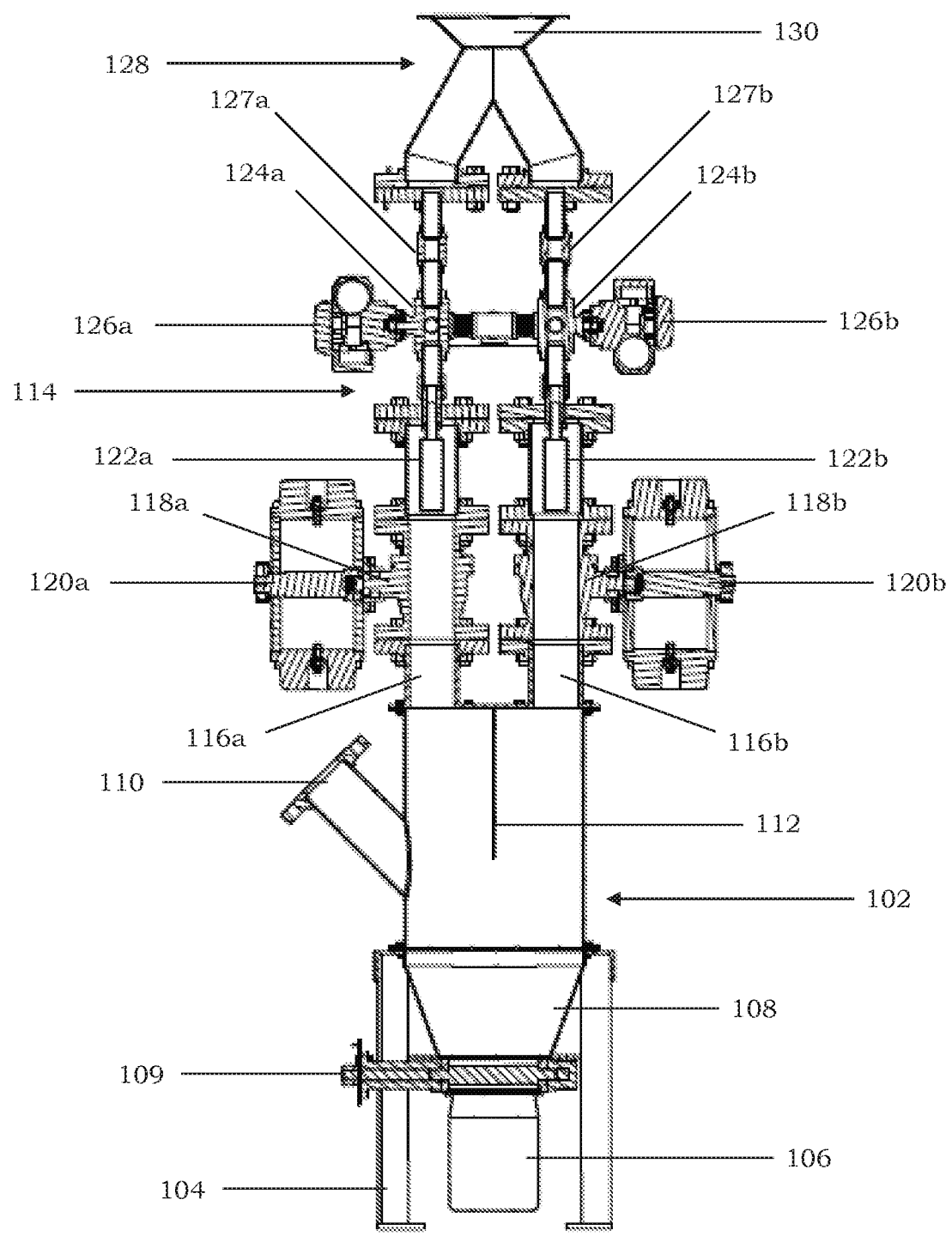
FIG. 3 is a cross-sectional view of the system of FIG. 1.
Figure 4:
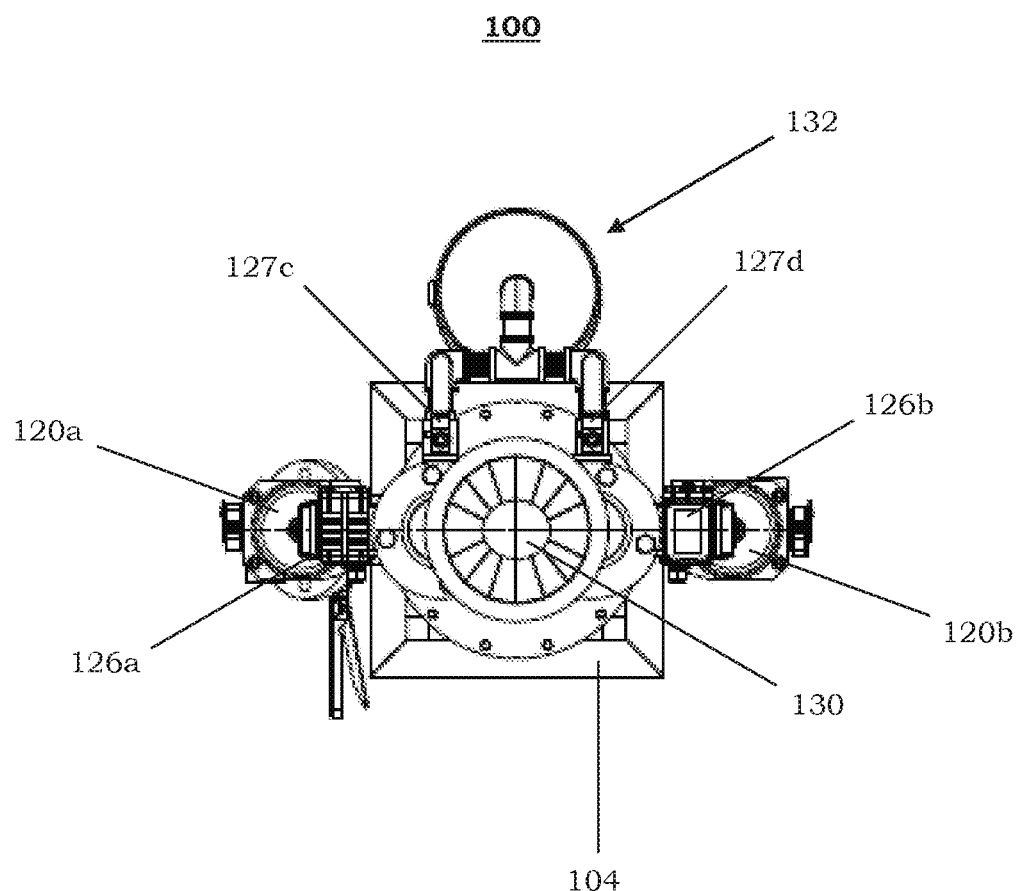
FIG. 4 is a plan view of the system of FIG. 1.

FIG. 1 is a perspective view of a system for removing particulates of a fissile material according to an example embodiment. FIG. 2 is another perspective view of the system of FIG. 1. FIG. 3 is a cross-sectional view of the system of FIG. 1. FIG. 4 is a plan view of the system of FIG. 1. Referring to FIGS. 1-4, a system 100 for removing particulates of a fissile material may include a conduit structure including a lower section 102, an intermediate section 114, and an upper section 128. The system 100 is configured to receive and filter particulates from a gas stream (e.g., air stream, effluent stream), wherein the gas stream enters the system 100 through the lower section 102, flows through the intermediate section 114, and exits through the upper section 128. Thus, the lower section 102 is arranged so as to be upstream from the intermediate section 114, and the upper section 128 is arranged so as to be downstream from the intermediate section 114. Although the system 100 is shown as having a vertical orientation, it should be understood that the system 100 may alternatively have an angled orientation or even a horizontal orientation. Additionally, in the drawings, each of the lower section 102, the intermediate section 114, and the upper section 128 of the conduit structure is shown as being made of one or more constituent parts. It should be understood that one or more of the various sections of the conduit structure may be integrally formed so as to be permit assembly from fewer components than as shown.

A support structure 104 may be used to position, stabilize, or otherwise secure the system 100. In an example embodiment, the support structure 104 interfaces with the lower section 102 and may be secured (e.g., bolted) to the floor. In another instance, the support structure 104 (or an additional support structure) may interface with the intermediate section 114 and/or the upper section 128 and may be secured to one or more walls and/or the ceiling.

The lower section 102 defines an inlet flow path 110 and a chute portion 108. The lower section 102 may have a shape that resembles a canister, a kettle, or a vat, although example embodiments are not limited thereto. The inlet flow path 110 is configured to receive a gas stream for filtration by the system 100. In a non-limiting embodiment, the gas stream is an effluent gas containing particulates of a fissile material. In such an instance, the inlet flow path 110 may be connected to an exhaust pipe supplying the effluent gas from process equipment (e.g., nuclear fuel fabrication equipment). In FIGS. 1-3, the inlet flow path 110 is shown as being angled such that, during the operation of the system 100, the gas stream enters the lower section 102 in a downward direction. However, it should be understood that other orientations are possible. For example, the inlet flow path 110 may be oriented so as to be orthogonal to a longitudinal axis of the conduit structure. In another instance, the inlet flow path 110 may be angled such that, during the operation of the system 100, the gas stream enters the lower section 102 in an upward direction.

A baffle 112 may be provided within the lower section 102 of the conduit structure so as to be above the chute portion 108. The baffle 112 is positioned and/or dimensioned (e.g., sized) so as to provide adequate clearance for the incoming gas stream through the inlet flow path 110. The baffle 112 may be in the form of a plate that extends between the inner walls of the lower section 102 so as to bisect the space defined therein leading to the first filtration path 116a and the second filtration path 116b. As a result, in such an instance, a gas stream flowing upward on the left side of the baffle 112 will be directed to the first filtration path 116a, while a gas stream flowing upward on the right side of the baffle 112 will be directed to the second filtration path 116b. The baffle 112 facilitates the settling and subsequent collection of the particulates (e.g., dislodged particulates) within the system 100.

The chute portion 108 of the lower section 102 is configured to collect the particulates from the gas stream (e.g., effluent gas). The particulates collected in the chute portion 108 include particulates which initially settle when the gas stream enters the system 100 via the inlet flow path 110 (e.g., relatively large particulates) as well as particulates which are dislodged during a blowback and subsequently settle in the chute portion 108. The chute portion 108 may be a vertical segment of the conduit structure that is directly or obliquely below the first filtration path 116a and the second filtration path 116b. The chute portion 108 of the conduit structure may also have a tapered end to facilitate the aggregation of the particulates collected therein.

A collection container 106 may be connected to a bottom of the chute portion 108 of the conduit structure and configured to collect the particulates, such as the particulates dislodged by the countercurrent flow of a purging gas during a blowback (which will be discussed further herein). The collection container 106 is secured to the chute portion 108 in an appropriate manner that permits convenient removal and replacement (e.g., via latching, bayonet connection, threaded engagement). In addition, it should be understood that the collection container 106 is not limited to the configuration shown and can have other suitable and favorable geometries based on the dimensions of the chute portion 108 and the type of connections) thereto. An isolation valve (e.g., manual isolation valve) may be added to the chute portion 108 to facilitate the removal and emptying of the collection container 106. The isolation valve may be in the form of a ninth valve 109 shown in FIGS. 1-3.

The intermediate section 114 defines a first filtration path 116a and a second filtration path 116b. The first filtration path 116a and the second filtration path 116b are configured to permit independent filtration of the gas stream as well as independent periodic blowbacks to dislodge the particulates on the first filter 122a and second filter 122b. In this regard, the first filtration path 116a and the second filtration path 116b may have various forms and variations. In a non-limiting embodiment, the first filtration path 116a and the second filtration path 116b may be bifurcated paths that stem from the inlet flow path 110. Furthermore, although only a first filtration path 116a and a second filtration path 116b are shown, it should be understood that the system 100 may include additional filtration paths. For instance, a third filtration path (and additional filtration paths) may be provided and configured to permit independent filtration of the gas stream as well as independent periodic blowbacks to dislodge the particulates on the filter therein.

A first filter 122a and a first valve 124a are disposed in the first filtration path 116a of the conduit structure. The first valve 124a is disposed downstream from the first filter 122a. In an example embodiment, the first valve 124a is above the first filter 122a. In addition, the first filter 122a is between the first valve 124a and the inlet flow path 110. The first valve 124a may be a three-way ball valve. The first valve 124a is operated by a first actuator 126a.

A second filter 122b and a second valve 124b are disposed in the second filtration path 116b of the conduit structure. The second valve 124b is disposed downstream from the second filter 122b. In an example embodiment, the second valve 124b is above the second filter 122b. In addition, the second filter 122b is between the second valve 124b and the inlet flow path 110. The second valve 124b may be a three-way ball valve. The second valve 124b is operated by a second actuator 126b.

At least one of the first filter 122a and the second filter 122b may include a portion in a form of a porous, hollow cylinder. The porous, hollow cylinder may define an internal flow channel therein. In addition, the porous, hollow cylinder may be arranged in the first filtration path 116a and/or the second filtration path 116b such that the gas stream permeates through the sidewall of the cylinder (e.g., in a radial direction) to the internal flow channel therein and then continues through the internal flow channel and away from the cylinder (e.g., in a longitudinal direction) along the first filtration path 116a and the second filtration path 116b toward the outlet flow path 130. In a non-limiting embodiment, at least one of the first filter 122a and the second filter 122b may be a sintered metal filter. The metal may be a nickel-copper alloy (e.g., Monel) or other material that is compatible with the process fluid. In other instances, the filter media may be made of a suitable plastic and fibrous material.

The first valve 124a and the second valve 124b are configured to switch between a dual open state and a mixed open/closed state when filtering the particulates from the gas stream (e.g., effluent gas). During the dual open state, the first valve 124a and the second valve 124b are both open to permit concurrent flows of the effluent gas through the first filtration path 116a and the second filtration path 116b. On the other hand, during the mixed open/closed state, one of the first valve 124a and the second valve 124b is open, while the other of the first valve 124a and the second valve 124b is closed to permit the particulates on a corresponding one of the first filter 122a and the second filter 122b to be dislodged by a blowback action. During the operation of the system 100, the first valve 124a and the second valve 124b are configured to be in a dual open state for a primary time period (e.g., dual open state as a default) and to be in a mixed open/closed state for a shorter secondary time period (e.g., brief durations of the secondary time period between the primary time periods). In a non-limiting embodiment, during the operation of the system 100, the first valve 124a and the second valve 124b are in a dual open state that is punctuated by periodic intervals of a mixed open/closed state. For instance, the first valve 124a and the second valve 124b may be in a dual open state for about five to ten minutes followed by a mixed open/closed state of about one to three seconds for a blowback action (before returning to the dual open state followed by another mixed open/closed state and so forth).

A blowback assembly 132 is configured to supply a countercurrent flow of a purging gas to a closed one of the first filtration path 116a and the second filtration path 116b (e.g., via a port of the first valve 124a or the second valve 124b) during the mixed open/closed state. When at least one of the first filter 122a and the second filter 122b includes a portion in a form of a porous, hollow cylinder (as discussed supra), the purging gas will travel down the closed one of the first filtration path 116a and the second filtration path 116b and enter the internal flow channel of the cylinder (e.g., in a longitudinal direction) and then move outwards through the sidewall of the cylinder (e.g., in a radial direction), thereby dislodging particulates from the pores, voids, and interstices of the cylinder. Thus, during a blowback action, the purging gas will take a path through the filter that is a reverse of the path taken by the gas stream during filtration.

In an example embodiment, the purging gas is an inert gas (e.g., nitrogen ($N_2$) gas). The purging gas may be provided from a compressed source (e.g., supply tank). During the mixed open/closed state, one of the first valve 124a and the second valve 124b is open with forward flow while the other of the first valve 124a and the second valve 124b is closed with countercurrent flow to permit the particulates on a corresponding one of the first filter 122a and the second filter 122b to be dislodged by the countercurrent flow of the purging gas.

For instance, during the mixed open/closed state, the first valve 124a and the second valve 124b may be configured to be open and closed, respectively (e.g., on duplicate or independent time intervals), to permit the particulates on the second filter 122b to be dislodged by the countercurrent flow of the purging gas from the blowback assembly 132 while the effluent gas continues to be filtered by the first filter 122a. Conversely, during the mixed open/closed state, the first valve 124a and the second valve 124b may be configured to be closed and open, respectively, to permit the particulates on the first filter 122a to be dislodged by the countercurrent flow of the purging gas from the blowback assembly 132 while the effluent gas continues to be filtered by the second filter 122b.

The first valve 124a and the second valve 124b are configured to alternate being open and closed during the mixed open/closed state such that the one of the first valve 124a and the second valve 124b that is open during the current mixed open/closed state will be closed during a next mixed open/closed state. For instance, if the first valve 124a is open during the current mixed open/closed state, then the first valve 124a will be closed during the next mixed open/closed state (and open during the subsequent mixed open/closed state, etc.). Similarly, if the second valve 124b is closed during the current mixed open/closed state, then the second valve 124b will be open during the next mixed open/closed state (and closed during the subsequent mixed open/closed state, etc.).

The system 100 may include a third valve 118a and a fifth valve 127a in the first filtration path 116a. The system 100 may also include a fourth valve 118b and a sixth valve 127b in the second filtration path 116b. The third valve 118a and the fourth valve 118b are operated by a third actuator 120a and a fourth actuator 120b, respectively. The third valve 118a and the fourth valve 118b are configured to remain open during the operation of the system 100 (e.g., during the dual open state and the mixed open/closed state of the first valve 124a and the second valve 124b). However, the third valve 118a and the fifth valve 127a as well as the fourth valve 118b and the sixth valve 127b can be closed in conjunction with the first valve 124a and the second valve 124b, respectively, to allow for maintenance on the system 100. For instance, the first valve 124a, the third valve 118a, and the fifth valve 127a can be closed to allow access to the first filter 122a (e.g., for inspection, cleaning, replacement). Similarly, the second valve 124b, the fourth valve 118b, and the sixth valve 127b can be closed to allow access to the second filter 122b (e.g., for inspection, cleaning, replacement). The fifth valve 127a and the sixth valve 127b may be manually operated to provide the requisite isolation from downstream processes when performing maintenance on the first filter 122a and the second filter 122b. Furthermore, the blowback path to the first filter 122a and the second filter 122b may be closed off by manual isolation valves (e.g., the seventh valve 127c and the eighth valve 127d) to permit maintenance on the blowback assembly 132.

The upper section 128 defines an outlet flow path 130. In an example embodiment, the first filtration path 116a and the second filtration path 116b converge to form the outlet flow path 130. A high efficiency particulate air (HEPA) filter (or other filtration media or wet scrubber) may be connected to the outlet flow path 130 of the conduit structure. As a result of the systems and methods disclosed herein, the buildup of particulates on the HEPA filter may be reduced to a more desirable level. Consequently, the replacement of the HEPA filter (e.g., primary HEPA filter, secondary HEPA filter) can be performed less frequently.

Figure 5:
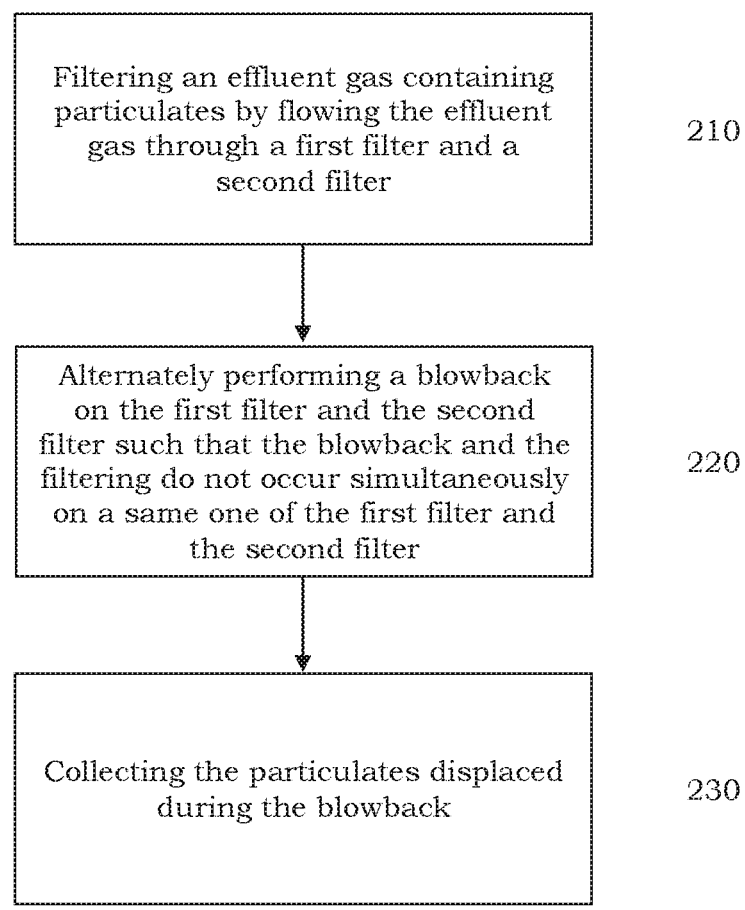
FIG. 5 is a flow chart of a method of removing particulates of a fissile material according to an example embodiment.

FIG. 5 is a flow chart of a method of removing particulates of a fissile material according to an example embodiment. Referring to FIG. 5, a method 200 of removing particulates of a fissile material includes filtering 210 an effluent gas containing the particulates by flowing the effluent gas through a first filter and a second filter. Additionally, the method includes alternately performing a blowback 220 on the first filter and the second filter such that the blowback and the filtering do not occur simultaneously on a same one of the first filter and the second filter. Furthermore, the method may include collecting 230 the particulates displaced during the blowback.

The filtering 210 may include initially flowing the effluent gas in a radial direction into the first filter and the second filter and subsequently flowing the effluent gas in a longitudinal direction away from the first filter and the second filter. The step of alternately performing the blowback 220 includes supplying a countercurrent flow of purging gas.

The step of collecting 230 may include allowing the particulates to fall from the first filter and the second filter via gravity. A device for providing mechanical vibrations may optionally be used to help dislodge particulates within the system. The step of collecting 230 may also include gathering oxides of the fissile material as the particulates. In an example embodiment, the oxides of the fissile material may include oxides of uranium (e.g., $UO_x$, $U_xO_y$) or oxides of plutonium. Furthermore, the systems and methods disclosed herein may be operated/performed manually by a technician or automatically with a controller.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A system for removing particulates of a fissile material, comprising:
   a conduit structure including a lower section, an intermediate section, and an upper section, the lower section defining an inlet flow path and a chute portion, the inlet flow path configured to receive an effluent gas containing the particulates of the fissile material, the chute portion configured to collect the particulates of the fissile material from the effluent gas, the intermediate section defining a first filtration path and a second filtration path, the upper section defining an outlet flow path;
   a first filter and a first valve in the first filtration path of the conduit structure;
   a second filter and a second valve in the second filtration path of the conduit structure, the first filter and the second filter configured to remove the particulates of the fissile material from the effluent gas, the first valve and the second valve configured to switch between a dual open state and a mixed open/closed state when filtering the particulates of the fissile material from the effluent gas, the first valve and the second valve being open during the dual open state to permit concurrent flows of the effluent gas through the first filtration path and the second filtration path;
   a third valve in the first filtration path of the conduit structure and below the first filter, the third valve adjacent to a lowermost portion of the first filter; and
   a fourth valve in the second filtration path of the conduit structure and below the second filter, the fourth valve adjacent to a lowermost portion of the second filter,
   the third valve and the fourth valve configured to preclude any forward flow to the first filter and the second filter, respectively, when in a closed state, the third valve and the fourth valve being above the inlet flow path; and
   a blowback assembly configured to supply a countercurrent flow of an inert gas as a purging gas to a closed one of the first filtration path and the second filtration path during the mixed open/closed state, one of the first valve and the second valve being open during the mixed open/closed state while the other of the first valve and the second valve being closed to permit the particulates of the fissile material on a corresponding one of the first filter and the second filter to be dislodged by the countercurrent flow of the purging gas.

2. The system of claim 1, wherein the first filtration path and the second filtration path are bifurcated paths that stem from the inlet flow path.

3. The system of claim 1, wherein the first filtration path and the second filtration path converge to form the outlet flow path.

4. The system of claim 1, wherein the first valve is above the first filter, and the second valve is above the second filter.

5. The system of claim 1, wherein the first filter is between the first valve and the inlet flow path, and the second filter is between the second valve and the inlet flow path.

6. The system of claim 1, wherein at least one of the first filter and the second filter is a sintered metal filter.

7. The system of claim 1, wherein the first valve and the second valve are configured to be open and closed, respectively, during the mixed open/closed state to permit the particulates on the second filter to be dislodged by the countercurrent flow of the purging gas from the blowback assembly while the effluent gas continues to be filtered by the first filter.

8. The system of claim 1, wherein the first valve and the second valve are configured to be closed and open, respectively, during the mixed open/closed state to permit the particulates on the first filter to be dislodged by the countercurrent flow of the purging gas from the blowback assembly while the effluent gas continues to be filtered by the second filter.

9. The system of claim 1, wherein the first valve and the second valve are configured to be in a dual open state for a primary time period and to be in a mixed open/closed state for a shorter secondary time period.

10. The system of claim 1, wherein the first valve and the second valve are configured to alternate being open and closed during the mixed open/closed state such that the one of the first valve and the second valve that is open during the mixed open/closed state will be closed during a next mixed open/closed state.

11. The system of claim 1, wherein the chute portion is a vertical segment of the conduit structure.

12. The system of claim 1, wherein the chute portion of the conduit structure has a tapered end.

13. The system of claim 1, further comprising:
a collection container connected to a bottom of the chute portion of the conduit structure and configured to collect the particulates dislodged by the countercurrent flow of the purging gas.

14. The system of claim 1, further comprising:
a high efficiency particulate air (HEPA) filter connected to the outlet flow path of the conduit structure.

15. The system of claim 6, wherein the sintered metal filter includes a nickel-copper alloy.

16. The system of claim 1, wherein at least one of the first filter and the second filter includes a portion in a form of a porous, hollow cylinder that defines an internal flow channel and is configured to permit the effluent gas to permeate through a sidewall of the porous, hollow cylinder in a radial direction to the internal flow channel.

17. The system of claim 1, wherein the inlet flow path is angled such that the effluent gas enters the lower section in a downward direction.

18. The system of claim 1, wherein each of the first valve and the second valve is in a form of a ball valve.

19. The system of claim 1, wherein the lower section of the conduit structure includes a baffle that is disposed above the chute portion and below the third valve and the fourth valve.

20. A method of removing particulates of a fissile material, comprising:
filtering an effluent gas containing the particulates of the fissile material by flowing the effluent gas through a first filter and a second filter of a system, the system including a conduit structure, the first filter, a first valve, the second filter, a second valve, a third valve, a fourth valve, and a blowback assembly, the conduit structure including a lower section, an intermediate section, and an upper section, the lower section defining an inlet flow path and a chute portion, the inlet flow path configured to receive the effluent gas containing the particulates of the fissile material, the chute portion configured to collect the particulates of the fissile material from the effluent gas, the intermediate section defining a first filtration path and a second filtration path, the upper section defining an outlet flow path, the first filter and the first valve disposed in the first filtration path of the conduit structure, the second filter and the second valve disposed in the second filtration path of the conduit structure, the first valve and the second valve configured to switch between a dual open state and a mixed open/closed state when filtering the particulates of the fissile material from the effluent gas, the first valve and the second valve being open during the dual open state to permit concurrent flows of the effluent gas through the first filtration path and the second filtration path, the third valve disposed in the first filtration path of the conduit structure and below the first filter, the fourth valve disposed in the second filtration path of the conduit structure and below the second filter, the third valve and the fourth valve configured to preclude any forward flow to the first filter and the second filter, respectively, when in a closed state, the third valve and the fourth valve being above the inlet flow path, the third valve and the fourth valve being adjacent to a lower most portion of the first filter and the second filter, respectively;
alternately performing a blowback on the first filter and the second filter with the blowback assembly such that the blowback and the filtering do not occur simultaneously on a same one of the first filter and the second filter, the blowback assembly configured to supply a countercurrent flow of an inert gas as a purging gas to a closed one of the first filtration path and the second filtration path during the mixed open/closed state, one of the first valve and the second valve being open during the mixed open/closed state while the other of the first valve and the second valve being closed to permit the particulates of the fissile material on a corresponding one of the first filter and the second filter to be dislodged by the countercurrent flow of the purging gas; and
collecting the particulates of the fissile material displaced during the blowback.

21. The method of claim 20, wherein the filtering includes initially flowing the effluent gas in a radial direction into the first filter and the second filter and subsequently flowing the effluent gas in a longitudinal direction away from the first filter and the second filter.

22. The method of claim 20, wherein the collecting includes allowing the particulates to fall from the first filter and the second filter via gravity.

23. The method of claim 20, wherein the collecting includes gathering oxides of the fissile material as the particulates.

* * * * *